UNITED STATES PATENT OFFICE.

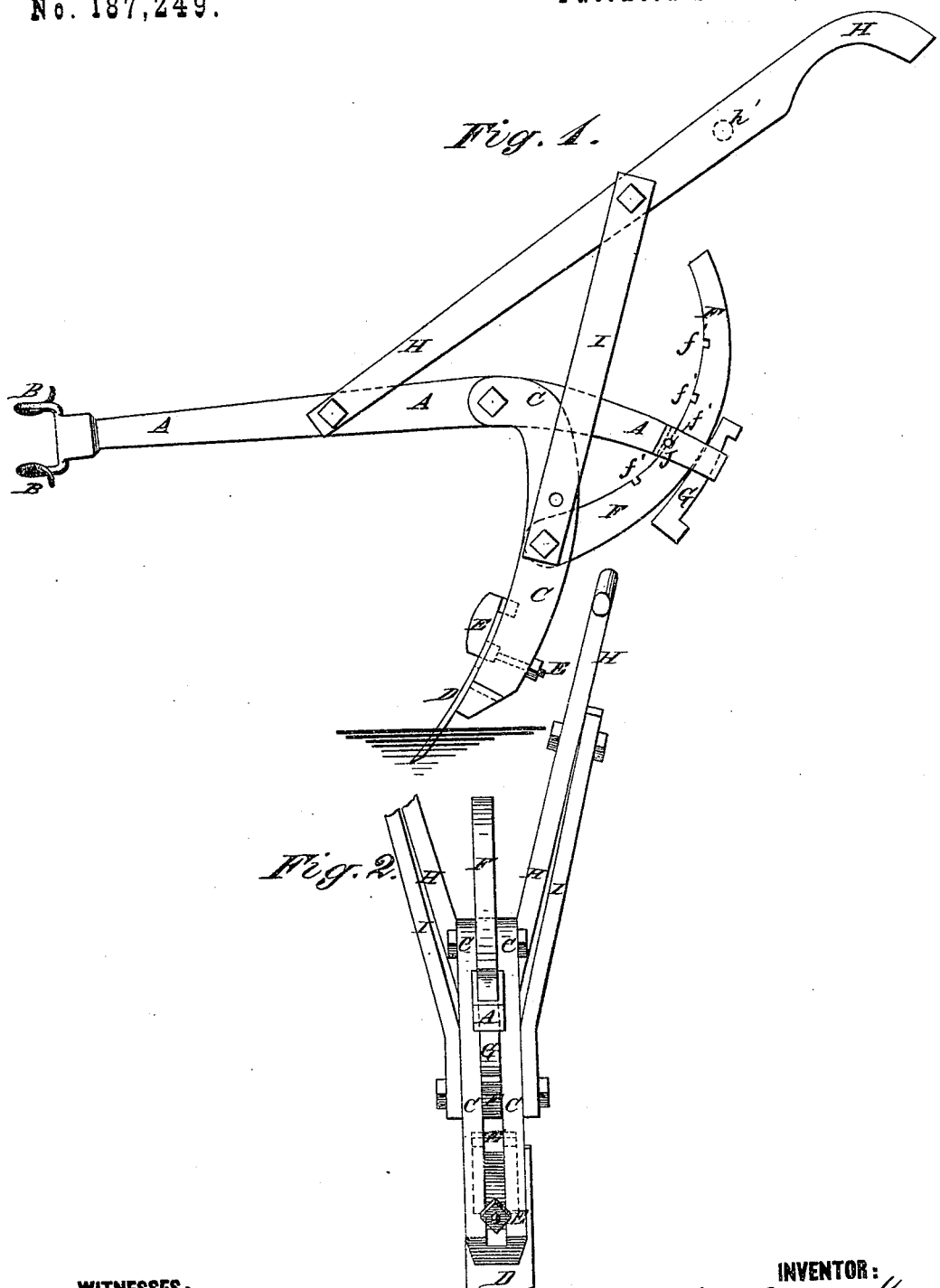

GIDEON BLACK, OF DADEVILLE, ALABAMA, ASSIGNOR TO HIMSELF AND JOHN T. MOYE, OF SAME PLACE.

IMPROVEMENT IN PLOWS.

Specification forming part of Letters Patent No. 187,249, dated February 13, 1877; application filed December 18, 1876.

*To all whom it may concern:*

Be it known that I, GIDEON BLACK, of Dadeville, in the county of Tallapoosa and State of Alabama, have invented a new and useful Improvement in Plows, of which the following is a specification:

Figure 1 is a side view of my improved plow. Fig. 2 is a rear view of the same.

Similar letters of reference indicate corresponding parts.

The object of this invention is to furnish an improved plow which shall be so constructed that it may be readily adjusted to work deeper or shallower in the ground, and which shall be simple in construction and convenient in use.

The invention will first be described in connection with the drawing, and then pointed out in the claims.

A is the plow-beam, upon the upper and lower parts of the forward end of which are formed spiral hooks B, to receive the draft, so that it may not be necessary to use lap-rings. The rear part of the beam A is inclined downward a little, as shown in Fig. 1. C is the standard, which is slotted longitudinally, and its upper end is bent forward, and is pivoted to the beam A by a bolt. D is the plow, which rests upon the forward side of the lower end of the standard C, and is secured in place by a bolt, E, which passes through the said plow and through the slot in the said standard. The head of the bolt E is made long, and has a projection formed upon it, which enters the slot of the standard C at the upper edge of the plow D, to keep the said plow from turning upon its seat. F is a tapering curved bar, the lower end of which enters the slot in the middle part of the standard C, and is pivoted to said standard by a bolt. The bar F passes through a slot in the rear end of the beam A, and is secured in place adjustably by a tapering key, G, which is passed through the slot in the said beam A, along the rear edge of the said bar F, and has a head formed upon each end, to prevent it from dropping out, and to enable it to be conveniently driven tight and loose when desired.

By this construction, by loosening the key G, the plow may be adjusted at any desired pitch, and, when adjusted, may be secured firmly in place by again tightening the said key G.

H are the handles, the lower ends of which are pivoted to the opposite sides of the beam A by a bolt. The handles H are connected by a round, $h'$, and are supported by the braces I. The upper ends of the braces I are pivoted to the handles H by bolts, and their lower ends are pivoted to the middle part of the standard C by the same bolt that pivots the lower end of the bar F to said standard C.

By this construction the handles H and braces I will move upon their pivots when the the standard C is adjusted, and will be held firmly in place when the standard C is locked. Several holes are formed in the lower parts of the braces I to receive the bolt, so that the handles can be adjusted at any desired height.

To further secure the curved bar F in place, notches $f'$ may be formed in its forward or concave edge, to receive a bolt or rivet, J, passed through the beam A in the forward end of the slot in which said bar F works, so that the bar F cannot slip when the key G has been driven tight.

Having thus described my invention, I claim—

1. The combination, with beam A and handles H, of the standard C, curved bar F, and braces I, all pivoted and arranged to admit of adjustment, in the manner described.

2. A plow-standard, C, and handles H, both pivoted to beam A, and connected by braces I, that are pivoted to each, as shown and described, to allow the several parts to be folded together, as set forth.

GIDEON BLACK.

Witnesses:
HENRY A. GARRETT,
J. P. OLIVER.